2,917,417

PROCESS FOR THE PURIFICATION OF DIFFUSION JUICE

Hein Israel Waterman, Delft, Netherlands, assignor to N. V. Centrale Suiker Maatschappij, Amsterdam, Netherlands, a company of the Netherlands No Drawing. Application March 26, 1954
Serial No. 419,081

Claims priority, application Netherlands April 1, 1953

3 Claims. (Cl. 127—50)

The present invention relates to the purification of diffusion juice obtained from beet cuttings by low-temperature diffusion with the use of $SO_2$. The juice may have been obtained by continuous as well as by discontinuous diffusion.

By low-temperature diffusion is to be understood a diffusion which takes place at a temperature below 60° C. At 60° C., when $SO_2$ is used, a relatively large amount of invert sugar is formed, so that it is preferred to keep the temperature within the range 35–40° C., e.g., at about 38° C.

In general the colloids of the raw juice obtained by hot diffusion are precipitated by lime at a pH of about 11.0. As a result of this single lime addition a mucous precipitate is formed, which cannot be filtered off at a reasonable rate. For this reason, instead of 0.2% of CaO (calculated on the beets, sufficient to attain a pH=11.0) an excess of line, viz. 1.5–2.0% of CaO, is added during hot diffusion, and carbon dioxide is subsequently introduced until the pH is about 11.0: the so-called first carbonation. The mixture of colloids and $CaCO_3$ thus formed can readily be filtered off, upon which a second carbonation takes place in the filtrate until the pH is about 9.2. This is followed by a second filtration.

An amount of 1.5–2.0% of CaO is very high. By means of a special method the amount of lime may be somewhat reduced: first a preliminary defecation is effected by the addition of lime until the pH is about 11.0, and then the bulk of the lime is added to the juice. By the introduction of $CO_2$ the pH is brought to about 11.0, upon which filtration is effected, and this is followed again by the second carbonation and second filtration. In this way a total amount of 1.0–1.5% of CaO will be sufficient.

The preliminary defecation is generally carried out by the gradual addition of lime, so that the acidity is gradually brought to about 11.0. The colloids are then enabled to flocculate throughly, and do not peptize so readily, owing to the excess of lime subsequently added.

The preliminary defecation may be effected, inter alia, according to the Dedek method or the Brieghel-Müller method.

In the Dedek method the procedure is as follows: Milk of lime is added to the raw juice, in an amount corresponding to 0.04% CaO based on the beets and after a given period, preferably two minutes, milk of lime in the same amount is again added to this limed juice. This lime addition is repeated about six times, in a total period of 14 minutes, upon which the pH of the limed juice has become 11.0–11.2 (Becker, Zucker, 5, 70 (1952)).

Brieghel-Müller has developed an apparatus in which the rise of the pH proceeds much more regularly than in the Dedek method. The juice is fed continuously at one end of a tank, while the milk of lime, in an amount corresponding to about 0.35% CaO calculated on the beets, is introduced continuously at the other end. The tank is divided into compartments and provided with a stirring device. These compartments are separated from one another by partitions, the lower part of which is fixed, while the upper part is adapted to rotate about a vertical axis in the centre of the partition. Dependent on a given stirring rate and position of the movable partitions, the return of the mixture of raw juice and milk of lime in the direction of the raw juice inlet can be controlled. The duration of this preliminary purification is about 15 minutes. The rise of the pH from one compartment to the other may then be controlled without any locally occurring high alkalinities (Alstan and McGinnis, Sugar (January 1952), Becker, Zucker, 5, 383 (1952)).

As is known from Chimie et Ind., 63, 364 (1950), 65, 488 (1951), 66, 471 (1951), a diffusion at 38° C. with the aid of $SO_2$ results in a raw juice which has quite different colloidal properties from the raw juice obtained at a high temperature. In fact, it contains practically no colloids.

Thus, for example, the raw juice obtained during cold diffusion is found to behave differently when it is passed directly over an ion exchanger in the H form.

This raw juice obtained by cold diffusion, also behaves differently with regard to the purification by means of lime. It has been found that the juice obtained by cold diffusion, which has been brought to pH=10.8 by one single addition of lime, is filtered more readily than the juice obtained by hot diffusion, which has been treated in a similar manner (Chimie et Ind. 66, 471 (1951), and Sugar, October 1951, 35). Still this improved rate of filtration is by no means satisfactory. From the same articles it appears that during cold diffusion, too, an excess of lime (total amount required: 0.8–0.9%, calculated on the beets) and corresponding carbonation has to be applied in order to get a rate of filtration comparable with that of the hot diffusion. In the latter case 1.2% of CaO is used.

Now it appears that the rate of filtration is highly dependent on the way in which the lime is added, which is unexpected, because with the normal diffusion juice the preliminary defecation is advantageous in view of its favourable influence on the flocculation of the colloids, the colloids being almost entirely absent from the low-temperature $SO_2$ diffusion juice.

It was found that a fractional addition of the lime instead of one single addition of lime may even yield a juice that can be so readily filtered that the main liming with subsequent double carbonation may be omitted.

The manner in which the fractional addition of the lime takes place appears to affect the rate of filtration to be obtained.

Very good results were obtained with an amount of lime of 0.35%, calculated on the beets.

In the table below the purification of juice obtained by cold diffusion with $SO_2$ (38° C., 0.3% of $SO_2$ calculated on the charge of one diffuser) and by hot diffusion (79° C.) without $SO_2$ are compared.

In two experiments the preliminary defecation according to Brieghel-Müller was applied; in a third experiment the preliminary defecation was carried out according to Dedek. In the fourth experiment the lime was added in one single operation. The temperature at which the fractional preliminary defecation is effected has practically no effect on the rate of filtration. The process may be carried out at temperatures between about 15° and about 70° C.

of raw juice are obtained from each 100 kgm. of beet cossettes.

Table

| | Percent of CaO during preliminary defecation | main liming | total percent of CaO | filter surface, m.$^2$ | rate of filtration characterized by l.$^2$/sec. |
|---|---|---|---|---|---|
| 1. juice from the hot diffusion (without SO$_2$) | 0.20 (according to Brieghel-Müller) | 1.00 | 1.20 | 0.32 | 5.0 |
| 2. cold diffusion+SO$_2$ | 0.35 (according to Brieghel-Müller) | | 0.35 | 0.32 | 10.2 |
| 3. cold diffusion+SO$_2$ | 0.35 (according to Dedek) | | 0.35 | 0.32 | 5.4 |
| 4. cold diffusion+SO$_2$ | 0.35 (one addition) | | 0.35 | 0.32 | 2.4 |

It is thus found that during cold diffusion a fractional preliminary defecation leads to the extremely striking result that the magnitude characteristic of the rate of filtration is equal to, and in some cases even double the rate of filtration occurring during a normal diffusion with a defecation by means of an excess of lime and corresponding carbonation.

From the table it appears that the Brieghel-Müller method yields the best results.

As stated above, the diffusion juice may have been obtained either by continuous diffusion or by discontinuous. For obtaining the juice according to the continuous procedure, the tower diffusion method ("Zucker," vol. 6, 1953, page 344), employing a cossette pump, is used in extracting juice from sugar beet cuttings (cossettes). Sulfur dioxide is continuously added at the bottom of the tower in an amount of 0.2% based on the weight of the cossettes, and the temperature is maintained at not to exceed 40° C. The Siline number (i.e. number of m./100 gram cossettes) is approximately 30. The period of diffusion is 60 minutes, and 110 liters of juice per each 100 kgm. of cossettes are drawn off.

In the discontinuous procedure, the diffusion of beet cossettes is conducted in a diffusion battery, at the top of one diffuser sulfur dioxide being added, in an amount of about 0.3% (calculated on the amount of beet cossettes in the diffuser) during the period that raw juice is drawn off from the diffuser. The maximum temperature during the diffusion is 38° C. The Siline number is about 30. The diffusion time is 60 minutes, and about 110 liters of raw juice are obtained from each 100 kgm. of beet cossettes.

What I claim is:

1. Process for the purification of sugar diffusion juice, obtained by treating beet chips, at a temperature within the range from about 35° to about 40° C. in a diffusion vessel, with water under addition of from about 0.2 to about 0.3% of sulfur dioxide calculated on the weight of the beet chips, which consists essentially in the steps of subjecting the sugar diffusion juice, at a temperature between about 15° and about 70° C. to a purification treatment by the progressive addition thereto of from about 0.2% to about 0.35% of CaO calculated on the weight of the beet chips, and then filtering, carbonating the filtrate and again filtering.

2. A process according to claim 1, characterized in that about 0.35% of CaO, calculated on the beets, is progressively added.

3. A process according to claim 1, characterized in that the purification treatment is effected by progressive fractional counter-curent addition of lime.

References Cited in the file of this patent
UNITED STATES PATENTS 2,610,929     Brieghel-Müller _____ Sept. 16, 1952

FOREIGN PATENTS 2,603     Great Britain _____ of 1856

OTHER REFERENCES

The International Sugar Journal, May 1951, p. 136.
Sugar, October 1951, pp. 35–38.
McGinnis: Beet Sugar Tech., New York, 1951, pp. 197–211 (p. 200 pert.).